(12) United States Patent
Chen et al.

(10) Patent No.: US 10,680,876 B2
(45) Date of Patent: Jun. 9, 2020

(54) ADAPTIVE RECOVERY FROM NODE FAILURES IN A NETWORK SYSTEM

(71) Applicant: SIGNIFY HOLDING B.V., Eindhoven (NL)

(72) Inventors: Jinyun Chen, Shanghai (CN); Shengli Zhang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/543,331

(22) PCT Filed: Jan. 7, 2016

(86) PCT No.: PCT/EP2016/050233
§ 371 (c)(1),
(2) Date: Jul. 13, 2017

(87) PCT Pub. No.: WO2016/113181
PCT Pub. Date: Jul. 21, 2016

(65) Prior Publication Data
US 2018/0241613 A1    Aug. 23, 2018

(30) Foreign Application Priority Data

Jan. 14, 2015   (WO) ................ PCT/CN2015/070665
Feb. 13, 2015   (EP) .................................... 15154958

(51) Int. Cl.
*H04L 12/24*      (2006.01)
*H05B 47/175*     (2020.01)
(Continued)

(52) U.S. Cl.
CPC ...... *H04L 41/0659* (2013.01); *H04L 41/0803* (2013.01); *H04L 43/0817* (2013.01); *H05B 47/175* (2020.01)

(58) Field of Classification Search
CPC ............. H04L 41/0659; H04L 41/0803; H04L 43/0817; H04L 37/0245; H04L 47/175
(Continued)

(56) References Cited

U.S. PATENT DOCUMENTS

2013/0262937 A1\*  10/2013  Sridharan ........... G06F 11/0709
                                                      714/47.2

FOREIGN PATENT DOCUMENTS

CN      202738228 U     2/2013
WO      2013057666 A1   4/2013
(Continued)

OTHER PUBLICATIONS

Pfister, Gregory F., "An Introduction to the Infiniband Architecture," IBM Enterprise Server Group, Server Technology and Architecture, High Performance Mass Storage and Parallel I/O, Wiley-IEEE Press Publication, Dec. 2001 (28 Pages).

*Primary Examiner* — Yemane Mesfin
*Assistant Examiner* — Intekhaab A Siddiquee
(74) *Attorney, Agent, or Firm* — Meenakshy Chakravorty

(57) ABSTRACT

The present invention relates to a method and an apparatus for failure recovery in a network system, wherein a linked list is created, where each network node knows the network address of its neighbor node in at least one direction, wherein each network node sends a beacon to its neighbor node and has its neighbor node acknowledge receipt of the beacon, and wherein a network node checks with a switch device the port status of a port to which a neighbor node that has failed is connected in order to identify a replacement node.

11 Claims, 3 Drawing Sheets

(51) Int. Cl.
*H04L 12/16* (2006.01)
*H04L 12/26* (2006.01)

(58) Field of Classification Search
USPC .......................................................... 370/216
See application file for complete search history.

(56) References Cited

FOREIGN PATENT DOCUMENTS

WO         2014024072 A2     2/2014
WO    WO-2014024072 A2 *   2/2014   ......... H05B 37/0254

* cited by examiner

ADAPTIVE RECOVERY FROM NODE FAILURES IN A NETWORK SYSTEM

CROSS-REFERENCE TO PRIOR APPLICATIONS

This application is the U.S. National Phase application under 35 U.S.C. § 371 of International Application No. PCT/EP2016/050233, filed on Jan. 7, 2016, which claims the benefit of European Patent Application No. 15154958.1, filed on Feb. 13, 2015 and International Patent Application No. PCT/CN2015/070665, filed on Jan. 14, 2015. These applications are hereby incorporated by reference herein.

FIELD OF THE INVENTION

The present invention relates to failure recovery in network systems such as, but not limited to, networked lighting control systems based on Internet Protocol (IP) networking. Such systems typically consist of embedded IP nodes, which are luminaires, sensors and possibly other IP devices connected via a technology e.g. IEEE 802.15.4 wireless networking with an IPv6 over Low power Wireless Personal Area Network (6LoWPAN) or Power over Ethernet (PoE) links that provide high-speed data connectivity and power to the IP nodes.

BACKGROUND OF THE INVENTION

Automation and lighting systems make use of communication networks. Over the past years, numerous types of networks have been proposed and are being used. The task of configuring devices and networks to achieve the needs of the specific installation is known as commissioning. In its broadest sense, commissioning encompasses a wide range of tasks, including a survey of the radio and physical environment, the placement of devices, configuration of parameters, application binding, optimization of network and device parameters, and testing and verification of correct operation. Often, non- and semi-technical issues need to be considered, including the skills and workflow practices of the installer, ease of identification and accessibility of devices, and interoperability and coexistence with other wireless or wired systems. The commissioning process involves a number of steps, namely finding and joining or creating a network, establishing a security association, discovering device(s) and service(s), and establishing a control relationship (sometimes referred to as finding and binding).

In communication networks, a node can be a connection point, a redistribution point or a communication endpoint (some terminal equipment). The definition of a node depends on the network and protocol layer referred to. A physical network node is an active electronic device that is attached to a network, and is capable of sending, receiving, or forwarding information over a communications channel.

Typically there are two types of logical topology structures in lighting control systems. One is a centralized system which has a central device or controller, so called "master" or "area controller" that manages the communication between a controller and an actuator and monitors the system health. The other one is a distributed architecture, where the controller directly communicates with the actuator and health monitoring is realized by regular inspection of office management staff.

When a node (e.g. a light or sensor or the like) breaks down in a network system, normally the node needs to be replaced and re-commissioned since the new node does not contain or know the configuration data and settings that are needed for correct operation of the node within the wider network system. In the distributed architecture without the central controller, detection of luminaire failure and recovery after replacement is difficult as there is no central device that monitors the various lighting devices and can commission a replacement device automatically.

In patent application US 20130262937, a method is shown that enables a network node to check if a different node in its network system has broken down by using a heartbeat mechanism in combination with data from the subnet manager within a switch.

SUMMARY OF THE INVENTION

It is an object of the present invention to provide a method and system for providing an effective maintenance solution for network systems.

These objects are achieved by an apparatus, by a method, by a network node, by a network system and by a computer program product, as described herein.

Accordingly, a linked list topology set up by a group of network nodes allows detection of a failed or malfunctioning network node by its neighbor node, so that this neighbor node can check with a connected switch device the port status of a port to which the network node that has failed is connected in order to identify the replacement node. Thereby, an adaptive failure recovery for IP-based or other intelligent lighting systems can be provided, especially for those system structures without area controller and/or lighting server.

This is different from patent application US 20130262937 as the present invention aims at detecting a replaced node and thereby allows improved failure handling, whereas the mentioned patent application aims at decreasing the time necessary to check if a node in a network has broken down.

According to a first option, the network information may include a network layer address, a link layer address, an address of the switch device and an identification of the port to which the neighbor node is connected. Thereby, sufficient information is directly available at the network node to check the status of the neighbor node and to determine whether it has been replaced or not.

According to a second option which can be combined with the first option, the network node comprises a luminaire device, and wherein the beacon signal contains a link layer address of the network node, a current control mode, a lighting scene and a sensor datum. The beacon signal can thus be used to convey control information for a lighting system through the network.

According to a third option which can be combined with any one of the above first and second options, the apparatus may be adapted to establish a temporary logic link with a neighbor node of the neighbor node in the at least one direction by sending a multicast signal within a group of nodes, if no acknowledgement signal has been received from the neighbor node in response to the beacon signal for the predetermined time period, and by building up a temporary link list when it receives a reply from the neighbor node of the neighbor node. The temporary link provides the advantage that the system can be made more robust, since neighborhood information remains available even if two neighboring nodes are replaced.

According to a fourth option which can be combined with any of the above first to third options, the apparatus may be adapted to request a link layer address of the neighbor node from a link layer address table of the switch device and to determine based on a received link layer address whether the neighbor node has been replaced or not. Thereby, the network node can easily determine whether its neighbor node has been replaced by simply comparing the received link layer address with the link layer address stored in a neighbor list of the network node.

According to a fifth option which can be combined with any of the above first to fourth options, the apparatus may be adapted to convert the received link layer address into a network layer address or to check an address resolution protocol table for an assigned network layer address, to copy configuration information of the network node to the neighbor node, to update neighbor information on the neighbor node, and to change neighbor information of the network node with network information of the neighbor node, if it has determined that the neighbor node has been replaced. Thereby, automatic reconfiguration after node replacement can be achieved.

According to a sixth option which can be combined with any of the above first to fifth options, the plurality of network nodes may be adapted to create the logic links so as to set up a logical circular linked list. The circular linked list topology ensures that each node has a neighbor node regardless of its geographical position within the network.

It is noted that the above apparatuses may be implemented in a network node based on discrete hardware circuitry with discrete hardware components, an integrated chip, or an arrangement of chip modules, or based on a signal processing device or chip controlled by a software routine or program stored in a memory, written on a computer readable medium, or downloaded from a network, such as the Internet.

It shall be understood that the apparatus, the method, the network node, the network system and the computer program described herein have similar and/or identical preferred embodiments.

It shall be understood that a preferred embodiment of the invention can also be any combination of the above embodiments.

These and other aspects of the invention will be apparent from and elucidated with reference to the embodiments described hereinafter.

DETAILED DESCRIPTION OF EMBODIMENTS

Embodiments of the present invention are now described based on an adaptive recovery procedure implemented in an IP based network, wherein the amount of time and effort required for network recovery after replacement of a malfunctioning or failed node is reduced by providing a recovery mechanism to automatically reconfigure the replaced node in accordance with the configuration of the previous node (i.e., the malfunctioning node).

According to various embodiments, at least a group of network nodes are adapted to create a linked list topology where each network node (e.g. luminaire) knows the IP address of its neighbor node in at least one direction (i.e., upstream neighbor and/or downstream neighbor), and the network nodes of the linked list topology are adapted to send a beacon to their upstream and/or downstream neighbor node and the upstream and/or downstream neighbor node is adapted to acknowledge receipt of the beacon. Furthermore, the network nodes are adapted to check with a switch node the port status of a port to which a network node that has failed is connected in order to identify the replacement node.

In the following embodiment, a group of nine luminaires in a predetermined area like a meeting room or personal office in a wired IP-based intelligent lighting system is provided. A luminaire is to be understood as an electrical device used to create artificial light by use of an electric lamp. It may be a versatile and multi-function instrument designed to replace multiple conventional lights. Depending on the venue and application, automated luminaires can be a versatile and economical addition to a stock of traditional lights because, with proper programming, they can swiftly alter many aspects of their optics, changing the "personality" of the light very quickly. The intelligent networked lighting system of the embodiment may further comprise relays, occupancy sensors, photocells, light control switches or touchscreens, and signals from other building systems (such as fire alarm or heating, ventilation and air conditioning (HVAC)).

Figure 1:
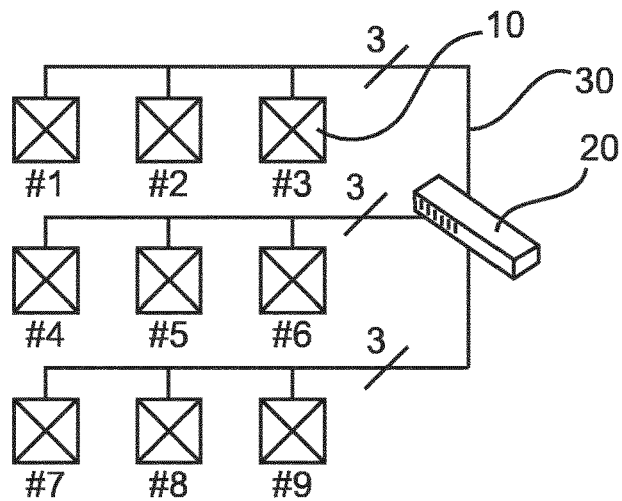
FIG. 1 shows a schematic wiring topology of a network system according to the embodiments.

FIG. 1 shows a schematic wiring topology according to a first embodiment with nine luminaires 10 which are designated #1 to #9 and which are connected to a light control switch (e.g. switch board) 20 via a respective control bus 30 having three bus lines. Thus, the physical topology structure is a star-shaped structure, where three luminaires 10 (i.e. #1 to #3, #4 to #6 and #7 to #9) are respectively connected through one respective branch of the star-shaped structure.

At a commissioning stage, these nine luminaires 10 are grouped and programmed, wherein network information of the next neighbor node (i.e. neighbor luminaire) in at least one direction is written to a memory provided in each luminaire 10. This network information may include a network layer address (e.g., an IP address) and a link layer address (e.g., a Media Access Control (MAC) address) of the next neighbor node, and a switch address and port name at the control switch 20 to which this next neighbor node is connected.

Figure 2:
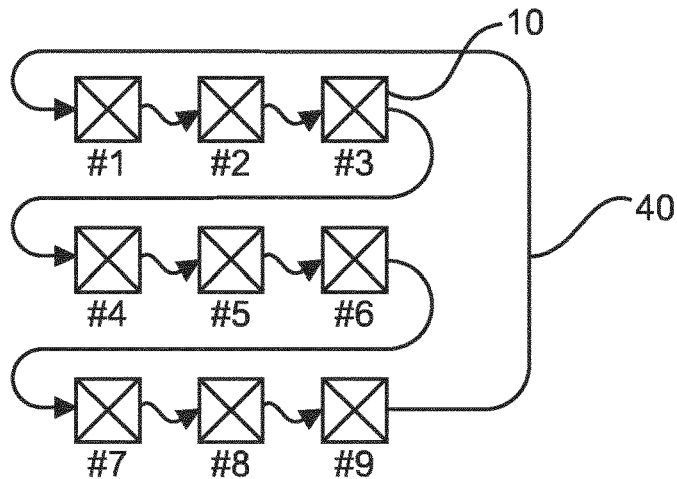
FIG. 2 shows a schematic circular linked list topology of a network system according to a first embodiment.

FIG. 2 shows a schematic circular linked list topology of a network system according to the first embodiment. As can be gathered from FIG. 2 shows, the stored references of the luminaires 10 to respective next neighbor luminaires (indicated by arrows 40 in FIG. 2) logically form a circular linked list, i.e., luminaire #1 stores the IP address of #2, luminaire #9 stores the IP address of luminaire #1, and so on.

Figure 3:
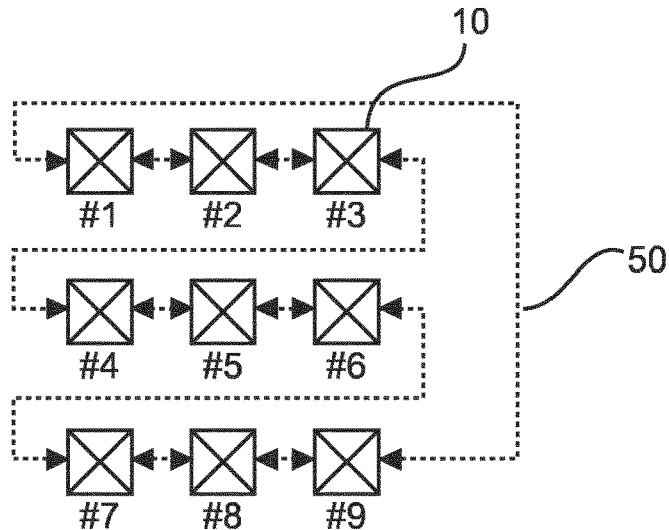
FIG. 3 shows a schematic illustration of a beacon and response communication in the linked list topology according to the first embodiment.

FIG. 3 shows a schematic illustration of a beacon and response communication in the linked list topology according to the first embodiment.

During normal operation, a communication within the luminaire group is conducted, wherein each luminaire 10 sends a beacon packet to its neighbor luminaire at a predetermined interval and gets a response, e.g., an acknowledgment (ACK) packet (indicated by broken double arrows 50 in FIG. 3). Thereby, both neighboring luminaires know each other working properly. The content of the beacon packet can be the sender's MAC address, and may also include a current control mode (e.g. automatic control mode or manual control mode), lighting scene (i.e., current lighting scene preset the luminaire is running at, e.g., preset 1 which corresponds to a meeting scene or preset 2 which corresponds to a relax scene) and sensor datum (e.g., sensor status (such as occupancy status), illuminance level, etc.).

There can be several reasons for a luminaire failure. In case of a power loss or a broken cable or the like, the luminaire will not be replaced. However, if the luminaire itself failures due to a malfunctioning or the like, the failed luminaire will be replaced by a new replacement luminaire which will be installed.

Figure 4A:
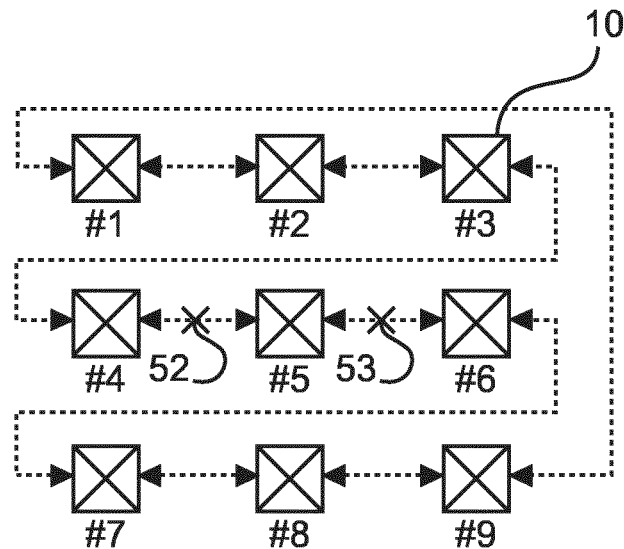
FIGS. 4A and 4B show a schematic illustration of a node failure and resulting communication with a switch device, respectively, in the circular linked list topology according to the first embodiment.
Figure 4B:
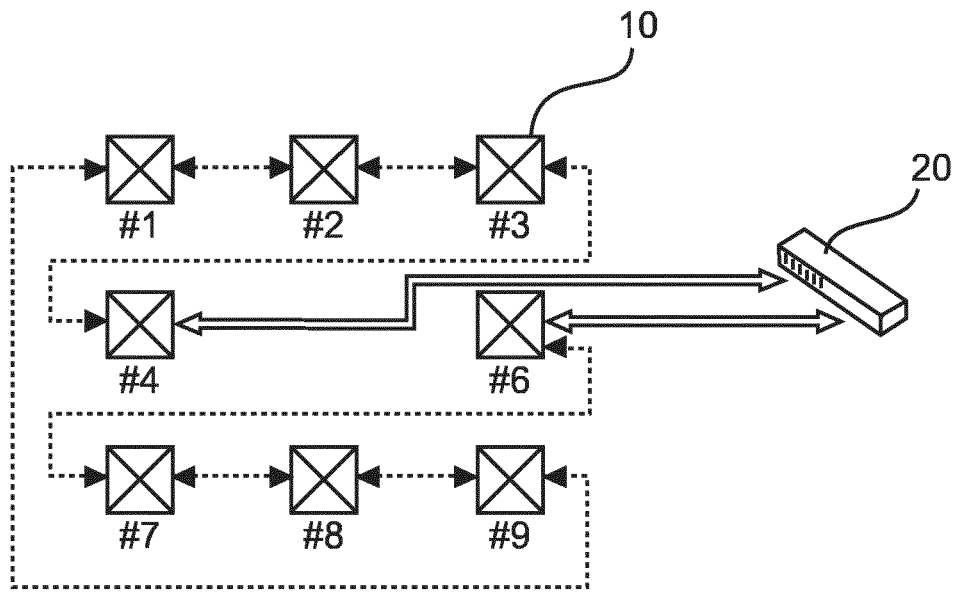

FIGS. 4A and 4B show a schematic illustration of a luminaire failure and a resulting communication with the control switch 20 of FIG. 1, respectively, in the circular linked list topology according to the first embodiment.

In the example of FIG. 4A, luminaire #5 is offline so that the communication with the next neighbor nodes in both directions fails, as indicated by the x'ed broken double arrows 52 and 53 in FIG. 4A. Consequently, due to the failure, luminaire #5 is disconnected from the network and next neighbor luminaire #4 on the downstream side of the circular linked list topology will not get a response from the failed luminaire #5 to its beacon packet (x'ed broken double arrow 52). Additionally, next neighbor luminaire #6 on the upstream side of the circular linked list topology will not get a beacon from the failed luminaire #5. After a few intervals, next neighbor luminaires #4 and #6 will determine that luminaire #5 is offline.

As shown in FIG. 4B, in response to the offline determination, neighbor luminaires #4 and #6 communicate with the control switch 20 so as to keep checking the port of the failed luminaire #5 until the port is online again.

However, if luminaire #6 breaks down after luminaire #5 and replacement of luminaire #6 is finished, the replaced new luminaire #6a does not get its configuration update because the new luminaire #5a does not have any neighbor information of the old luminaire #6 or the new luminaire #6a. In view of this, an additional mechanism according to a second embodiment is introduced to make the network system more robust.

Figure 5A:
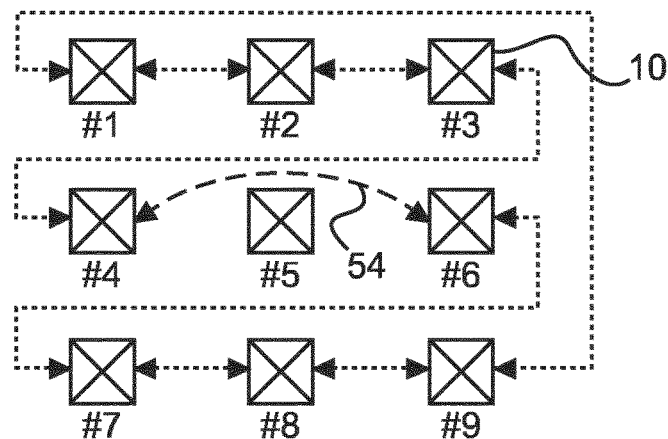
FIGS. 5A and 5B show a schematic illustration of a temporary bridging link and a resulting temporary link list, respectively, according to a second embodiment.
Figure 5B:
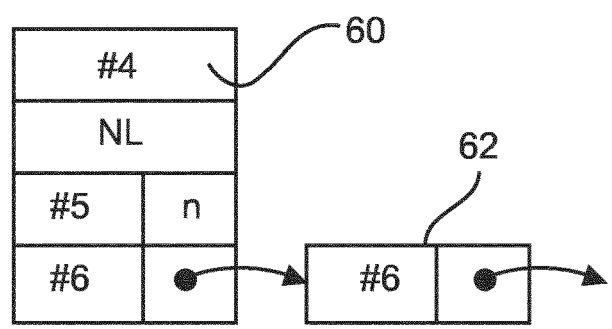

FIGS. 5A and 5B show a schematic illustration of a temporary bridging link 54 and a resulting temporary link list, respectively, according to the second embodiment. According to the second embodiment and as illustrated in FIG. 5A, luminaires #4 and #6 establish a temporary link 54 when they have determined that luminaire #5 is offline. To achieve this, luminaire #4 sends a multi-cast packet to the luminaire group searching for a neighbor of failed luminaire #6.

When luminaire #4 receives a reply from luminaire #6, it can build a temporary link list 60 in its memory to store the neighbor history, as illustrated in FIG. 5B. The temporary link list 60 of the neighbor history includes a neighbor list (NL) of luminaire #4, where next neighbor luminaire #5 is marked with a null flag (n) to indicate the missing link and a temporary link information 62 of luminaire #6 is added. A similar link list can also be set up at luminaire #6 to store the pre-neighbor information.

When the luminaire #5 is online again, its next neighbor luminaires #4 and #6 can get the MAC address of the replaced luminaire #5 from a MAC table provided at the control switch 20 and can compare the newly retrieved MAC address of luminaire #5 with the MAC address stored in their memory.

If luminaires #4 and #6 determine that the MAC address has not been changed, they can conclude that luminaire #5 has not been replaced and the whole system can go back to normal operation and send beacon packets at the predetermined interval.

Otherwise, if luminaires #4 and #6 determine that the MAC address has been changed, they can conclude that luminaire #5 has been broken or failed and then replaced, and automatic configuration takes place. To achieve this, luminaire #4 converts the retrieved new MAC address into an IP version 6 (IPv6) address or checks the Address Resolution Protocol (ARP) table (which is provided for resolution of network layer addresses into link layer addresses) for the assigned MAC address. Then, the luminaire #4 copies its own configuration to the memory of the new luminaire #5a and updates the neighbor information in the memory of new luminaire #5a. Meanwhile, the luminaires #4 and #6 change its own neighbor information in its neighbor list with the network information of the new luminaire #5a.

After configuration, the system reverts to normal operation.

Figure 6:
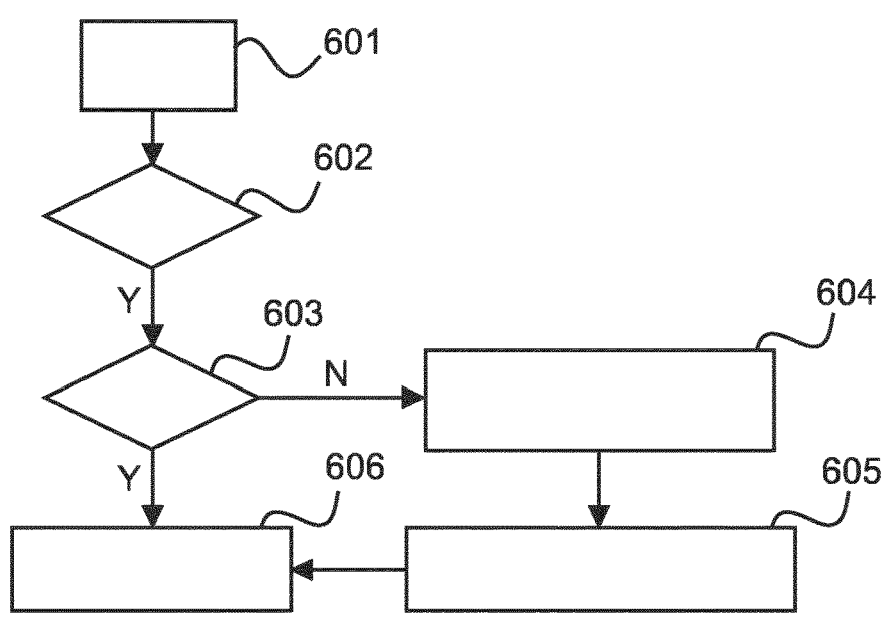
FIG. 6 shows a flowchart of a failure recovery processing according to the second embodiment.

FIG. 6 shows a flow diagram of a system recovery procedure of a network node (e.g. luminaire #4) after failure of its neighbor node (e.g. luminaire #5) of a lighting system according to the second embodiment.

The procedure starts with step 601 where the port of the silent (offline) luminaire (e.g. luminaire #5) is checked at first predetermined intervals. Then, in step 602, it is checked whether the port of the silent luminaire is active again, i.e., whether the luminaire is online again. If not, the procedure repeats steps 601 and 602 until it is determined in step 602 that the port of the silent luminaire is active again. If it is determined in step 602 that the luminaire is online again, the procedure continues with step 603 where it is checked (e.g., based on a derived address information) whether the luminaire has been replaced. If not, the procedure proceeds to step 606 where the neighbor status is checked at second predetermined intervals, e.g, by sending the beacon and waiting for a response. If it is determined in step 603, that the luminaire has been replaced, the procedure branches to step 604 and configuration and address information of the upstream neighbor (e.g. luminaire #6) is transferred to the replaced luminaire (e.g. luminaire #5a). Then, the own neighbor information is changed in the subsequent step 605 to the replaced luminaire. Finally, the procedure proceeds to step 606 where the neighbor status is checked at second predetermined intervals.

According to the above embodiments, node failure can be automatically detected and the system can adaptively recover from node replacement. To achieve this, a group of nodes set up a circular linked list and send periodic packets to their next neighbor node(s). After a node is offline, both its neighbor nodes monitor the switch port to which that node is connected. When the node is online again, its neighbor nodes check if the node has been replaced. Then, auto recovery is initiated if a replacement has been determined.

It is noted that the present invention is not restricted to the above embodiments and can be used for any type of network nodes in any type of network, such as professional and consumer networked lighting control systems based on IP communication, indoor and outdoor lighting, office lighting networks, building control or building automation networks, wired and wireless networks, as well as mixed deployments.

To summarize, a method and an apparatus for failure recovery in a decentralized network have been described, wherein a linked list is created, where each network node knows the network address of its neighbor node in at least one direction, wherein each network node sends a beacon to its neighbor node and has its neighbor node acknowledge receipt of the beacon, and wherein a network node checks with a switch device the port status of a port to which a neighbor node that has failed is connected in order to identify a replacement node.

The described operations of the components of the network system according to various embodiments can be implemented as program code means of a computer program and/or as dedicated hardware. More specifically, the described procedures like those indicated in FIG. 6 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

While the invention has been illustrated and described in detail in the drawings and foregoing description, such illustration and description are to be considered illustrative or exemplary and not restrictive. The invention is not limited to the disclosed embodiment with the lamps or luminaires as network nodes. It can be implemented in connection with any type loads, sensors, switches and the like in IP based or other lighting systems, for example PoE systems or other IP based facilities.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims. The mere fact that certain measures are recited in mutually different dependent claims does not indicate that a combination of these measures cannot be used to advantage.

The invention claimed is:

1. A network system for enabling failure recovery, comprising:
   a network node, wherein the network node comprises a memory and a first hardware processor that is configured to:
   create a logic link to at least one neighbor node in at least one of an upstream and downstream direction of the neighbor node by storing in said memory network information including at least an address and port identification of the neighbor node, wherein the neighbor node is connected to a switch device and wherein the port identification is an identification of a port of said switch device to which the neighbor node is connected;
   send a first beacon signal from the network node to the neighbor node;
   check for a receipt of an acknowledgement signal from the neighbor node, said acknowledgement signal acknowledging receipt by the neighbor node of the first beacon signal;
   check, based on the port identification, a status of the port of said switch device to which the neighbor node is connected, if no acknowledgement signal has been received by the network node in response to the first beacon, signal for a predetermined time period, wherein the status of the port of the switch device at least indicates an address of a given node connected to the port;
   determine based on the checked status of the port whether the neighbor node has been replaced, wherein the processor determines that the neighbor node has been replaced by determining that the address of the given node connected to the port is different from the address of the neighbor node stored in the network node; and
   automatically configure the given node in response to the determination that the neighbor node has been replaced,
   wherein the network system further comprises the given node and an additional node, wherein the additional node comprises a second hardware processor that is configured to receive, from the neighbor node, a second beacon signal comprising data defining a configuration of the neighbor node and wherein the given node is configured in accordance with said configuration.

2. The network system according to claim 1, wherein the network information includes at least one of an address of the switch device, a network layer address, or a link layer address.

3. The network system according to claim 1, wherein the network node comprises a luminaire device, and wherein the first beacon signal comprises at least one of a link layer address of the network node, a current control mode, a lighting scene or a sensor datum.

4. The network system according to claim 1, wherein the first hardware processor is configured to establish a temporary logic link with a particular node, which is a neighbor of the neighbor node, in the at least one of the upstream and downstream direction by sending a multicast signal within a group of nodes, if no acknowledgement signal has been received from the neighbor node in response to the first beacon signal for the predetermined time period, and by building up a temporary link list when the network node receives a reply from the particular node.

5. The network system according to claim 1, wherein said address of the neighbor node is a link layer address and wherein said first hardware processor is configured to request a link layer address from a link layer address table of the switch device and to determine based on a received link layer address whether the neighbor node has been replaced or not.

6. The network system according to claim 5, wherein said first hardware processor is configured to convert the received link layer address into a network layer address or to check an address resolution protocol table for an assigned network layer address, to copy configuration information of the network node to the given node, to update neighbor information on the given node, and to change neighbor information of the network node with network information of the given node, if the first hardware processor has determined that the neighbor node has been replaced.

7. The network system according to claim 1, further comprising a luminaire device, wherein said network system comprises a lighting network.

8. The network system according to claim 1, wherein the network node is a first network node and wherein the network system comprises comprising a plurality of network nodes, which includes said first network node, and said switch device, which comprises a plurality of respective ports to which said plurality of network nodes are connected.

9. The network system according to claim 8, wherein respective hardware processors of the plurality of network nodes are adapted to create logic links so as to set up a logical circular linked list.

10. A method of enabling failure recovery in a network system, the method comprising:
   creating a logic link to at least one neighbor node in at least one of an upstream and downstream direction of the neighbor node by storing network information including at least an address and a port identification of the neighbor node, wherein the neighbor node is connected to a switch device and wherein the port identification is an identification of a port of said switch device to which the neighbor node is connected;
   receiving from the neighbor node a first beacon signal comprising data defining a configuration of the neighbor node;
   sending a second beacon signal from a network node to the neighbor node;
   checking at the network node for a receipt of an acknowledgement signal from the neighbor node, said acknowledgement signal acknowledging receipt by the neighbor node of the second beacon signal;
   checking at the network node based on the port identification a status of the port of said switch device to which the neighbor node is connected;
   if no acknowledgement signal has been received by the network node in response to the second beacon signal for a predetermined time period, wherein the status of the port of the switch device at least indicates an address of a given node connected to the port;
   determining at the network node based on the checked status of the port that the neighbor node has been replaced by determining that the address of the given node connected to the port is different from the stored address of the neighbor node; and
   automatically configuring the given node in accordance with said configuration in response to the determination that the neighbor node has been replaced.

11. A non-transitory storage medium comprising a code of instructions that, when executed by a computer, cause the computer to perform the method of claim 10.

* * * * *